US011200636B2

(12) United States Patent
Chen et al.

(10) Patent No.: US 11,200,636 B2
(45) Date of Patent: Dec. 14, 2021

(54) METHOD AND APPARATUS FOR GENERATING A SERIES OF FRAMES WITH AID OF SYNTHESIZER TO OFFLOAD GRAPHICS PROCESSING UNIT RENDERING IN ELECTRONIC DEVICE

(71) Applicant: MEDIATEK INC., Hsin-Chu (TW)

(72) Inventors: Chiung-Fu Chen, Hsinchu (TW); Cheng-Che Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/698,977

(22) Filed: Nov. 28, 2019

(65) Prior Publication Data

US 2020/0175644 A1 Jun. 4, 2020

Related U.S. Application Data

(60) Provisional application No. 62/773,219, filed on Nov. 30, 2018.

(51) Int. Cl.
*G06T 1/20* (2006.01)
*G06T 1/60* (2006.01)
*G09G 5/00* (2006.01)

(52) U.S. Cl.
CPC .................. *G06T 1/20* (2013.01); *G06T 1/60* (2013.01); *G09G 5/006* (2013.01); *G09G 2360/18* (2013.01)

(58) Field of Classification Search
None
See application file for complete search history.

(56) References Cited

U.S. PATENT DOCUMENTS

| 2010/0104256 | A1* | 4/2010 | Tsurumi | G06K 9/00308 386/241 |
| 2012/0176396 | A1* | 7/2012 | Harper | G09G 5/373 345/589 |
| 2015/0269737 | A1* | 9/2015 | Lam | H04N 13/111 382/154 |
| 2017/0032764 | A1* | 2/2017 | Radhakrishnan | G06T 1/60 |
| 2019/0102859 | A1* | 4/2019 | Hux | G06F 9/505 |
| 2019/0222855 | A1* | 7/2019 | Shekhar | G09G 3/3618 |

FOREIGN PATENT DOCUMENTS

| CN | 107251133 A | 10/2017 |
| TW | 201344465 A | 11/2013 |
| TW | 201532029 A | 8/2015 |

* cited by examiner

*Primary Examiner* — Tize Ma
(74) *Attorney, Agent, or Firm* — Winston Hsu

(57) ABSTRACT

A method and apparatus for generating a series of frames with aid of a synthesizer to offload graphics processing unit (GPU) rendering within an electronic device are provided. The method may include: utilizing a GPU to perform full-rendering to generate a first frame in a color buffer, for being output to a display panel and displayed on the display panel; utilizing the GPU to generate a set of metadata of at least one subsequent frame in a metadata buffer; and utilizing the synthesizer to synthesize said at least one subsequent frame according to previous frame information and the set of metadata of said at least one subsequent frame, to generate said at least one subsequent frame in the color buffer, for being output to the display panel and displayed on the display panel.

22 Claims, 9 Drawing Sheets

METHOD AND APPARATUS FOR GENERATING A SERIES OF FRAMES WITH AID OF SYNTHESIZER TO OFFLOAD GRAPHICS PROCESSING UNIT RENDERING IN ELECTRONIC DEVICE

CROSS REFERENCE TO RELATED APPLICATIONS

This application claims the benefit of U.S. Provisional Application No. 62/773,219, which was filed on Nov. 30, 2018, and is included herein by reference.

BACKGROUND

The present invention is related to image display, and more particularly, to a method and apparatus for generating a series of frames with aid of a synthesizer to offload graphics processing unit (GPU) rendering within an electronic device, where the apparatus may comprise at least one portion (e.g. a portion or all) of the electronic device, such as a host processor, a processing circuit, etc. within the electronic device.

Modern games typically need huge GPU computing power of a GPU to achieve beautiful and complete scenario rendering. More particularly, the heavy load of the GPU may be introduced due to certain types of rendering tasks on the GPU, such as that of per-pixel processing regarding fragment shader. For example, a target frame rate may be achieved for smooth image display, but the whole system may suffer from high power consumption. For another example, a target frame rate may be unachievable, and the images cannot be smoothly displayed, causing the user experience to be degraded. Thus, there is a need of a novel method and associated architecture to enhance the overall display performance of an electronic device.

SUMMARY

An objective of the present invention is to provide a method for generating a series of frames with aid of a synthesizer to offload GPU rendering within an electronic device, and to provide associated apparatus such as the electronic device or a host processor, a processing circuit, etc. within the electronic device, in order to solve the aforementioned problems.

Another objective of the present invention is to provide a method for generating a series of frames with aid of a synthesizer to offload GPU rendering within an electronic device, and to provide associated apparatus such as the electronic device or a host processor, a processing circuit, etc. within the electronic device, in order to enhance overall performance of the electronic device.

At least one embodiment of the present invention provides a method for generating a series of frames with aid of a synthesizer to offload GPU rendering within an electronic device. The method may comprise: utilizing a GPU to perform full-rendering to generate a first frame in a color buffer, for being output to a display panel and displayed on the display panel, wherein the GPU, the color buffer, and the display panel are positioned in the electronic device; utilizing the GPU to generate a set of metadata of at least one subsequent frame in a metadata buffer, wherein the metadata buffer is positioned in the electronic device; and utilizing the synthesizer to synthesize said at least one subsequent frame according to previous frame information and the set of metadata of said at least one subsequent frame, to generate said at least one subsequent frame in the color buffer, for being output to the display panel and displayed on the display panel.

At least one embodiment of the present invention provides a host processor, where the host processor is applicable to generating a series of frames with aid of a synthesizer to offload GPU rendering within an electronic device. The host processor may comprise a core circuit, and comprise a display interface circuit and a bus interface circuit that are coupled to the core circuit. The core circuit may be arranged to control the host processor, for controlling operations of the electronic device, wherein under control of the core circuit, the host processor performs display control of the electronic device to generate the series of frames with aid of the synthesizer to offload the GPU rendering. In addition, the display interface circuit may be arranged to couple a display panel to the host processor, and the bus interface circuit may be arranged to couple at least one component to the host processor through a bus, wherein said at least one component comprises a GPU. For example, the host processor utilizes the GPU to perform full-rendering to generate a first frame in a color buffer, for being output to the display panel and displayed on the display panel, wherein the GPU, the color buffer, and the display panel are positioned in the electronic device; the host processor utilizes the GPU to generate a set of metadata of at least one subsequent frame in a metadata buffer, wherein the metadata buffer is positioned in the electronic device; and the host processor utilizes the synthesizer to synthesize said at least one subsequent frame according to previous frame information and the set of metadata of said at least one subsequent frame, to generate said at least one subsequent frame in the color buffer, for being output to the display panel and displayed on the display panel.

According to some embodiments, the present invention further provides a processing circuit comprising the host processor mentioned above, where the processing circuit may further comprise the color buffer, the metadata buffer, and the GPU. For example, the color buffer may be arranged to buffer frame information, and the metadata buffer may be arranged to buffer metadata. In addition, the GPU may be coupled to the host processor, the color buffer, and the metadata buffer, and may be arranged to operate under control of the host processor. More particularly, the processing circuit may comprise a random access memory (RAM) that is arranged to store information for the electronic device, wherein the color buffer and the metadata buffer may be implemented with different buffer regions in the RAM.

According to some embodiments, the present invention further provides the electronic device comprising the host processor mentioned above, where the electronic device may comprise a processing circuit and the display panel, and the processing circuit may comprise the host processor, the color buffer, the metadata buffer, and the GPU. For example, the host processor may be arranged to control the operations of the electronic device, the color buffer may be arranged to buffer frame information, and the metadata buffer may be arranged to buffer metadata. In addition, the GPU may be coupled to the host processor, the color buffer, and the metadata buffer, and may be arranged to operate under control of the host processor. Additionally, the display panel may be coupled to the host processor, and may be arranged to display information. More particularly, the processing circuit may comprise a RAM that is arranged to store information for the electronic device, wherein the color buffer and the metadata buffer may be implemented with different buffer regions in the RAM.

The present invention method and the associated apparatus (e.g. the host processor, the processing circuit, etc. within the electronic device) can properly control operations of the electronic device, and more particularly, can offload some rendering tasks from the GPU to the synthesizer, to enhance overall performance of the electronic device. For example, the electronic device may increase a frame rate (which may be measured in unit of frame per second (FPS)) to achieve better display performance. For another example, the electronic device may operate with less power, having no need to decrease the frame rate. In addition, implementing the embodiments of the present invention will not greatly increase additional costs, while solving problems of the related art. In comparison with conventional architecture, the present invention can achieve an optimal performance of the electronic device without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
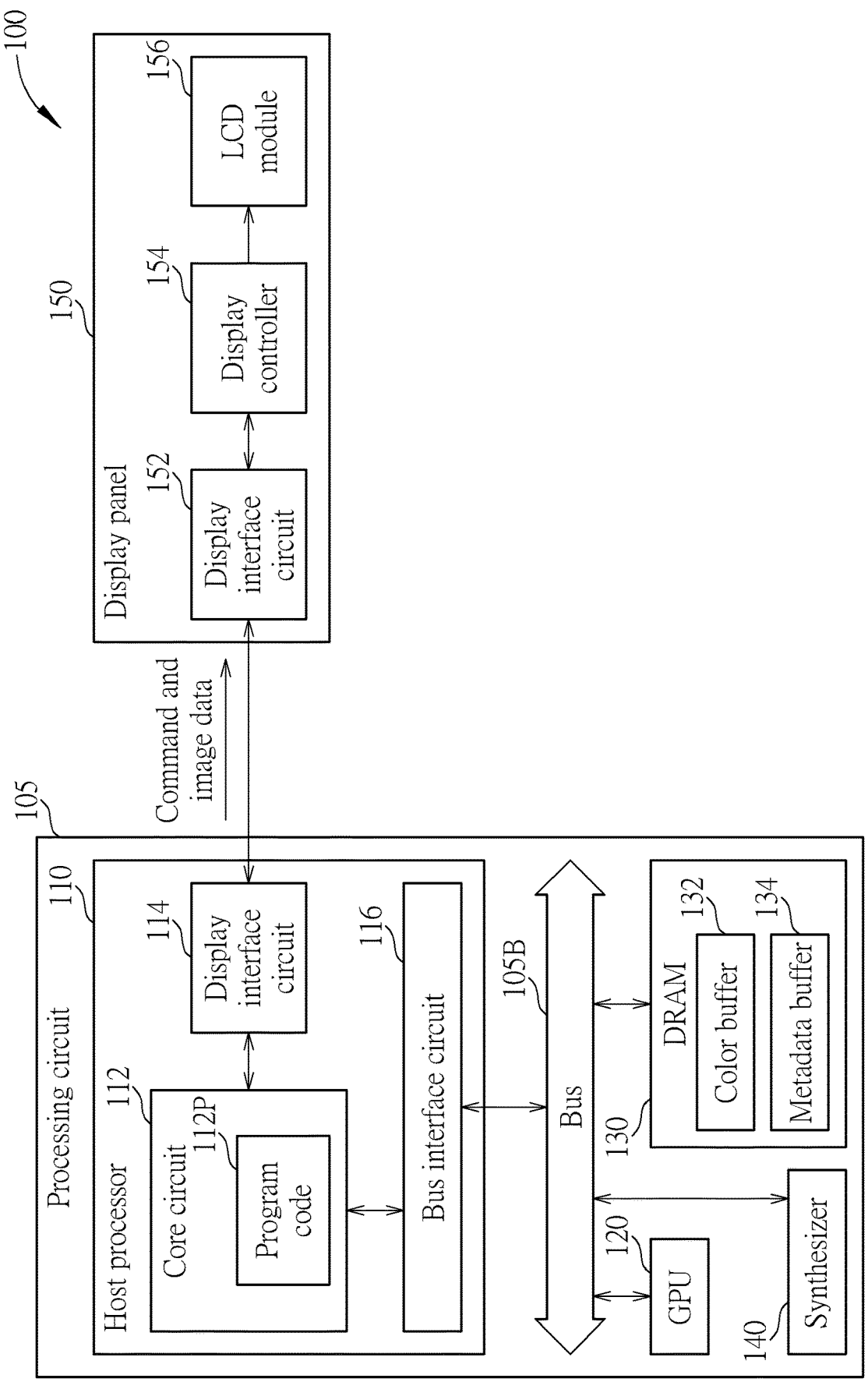
FIG. 1 is a diagram of an electronic device according to a first embodiment of the present invention.

FIG. 1 is a diagram of an electronic device 100 according to a first embodiment of the present invention. Examples of the electronic device may include, but are not limited to, a multifunctional mobile phone, a tablet computer, a wearable device, an all-in-one computer, and a laptop computer. As shown in FIG. 1, the electronic device 100 may comprise a processing circuit 105 and a display panel 150 that is coupled to the processing circuit 105, and the processing circuit 105 may comprise a bus 105B, a host processor 110 (e.g. a central processing unit (CPU)), a GPU 120, a random access memory (RAM) such as a dynamic RAM (DRAM) 130, and a synthesizer 140, and more particularly, the host processor 110 may comprise a core circuit 112, a display interface circuit 114, and a bus interface circuit 116, and the display panel 150 may comprise a display interface circuit 152, a display controller 154, and a display module such as a liquid crystal display (LCD) module 156, where the host processor 110, the GPU 120, the DRAM 130, and the synthesizer 140 may be coupled to each other through the bus 105B, and the display interface circuit 114 and the bus interface circuit 116 may be coupled to the core circuit 112 in a manner as shown in FIG. 1, but the present invention is not limited thereto. According to some embodiments, the architecture shown in FIG. 1 may vary. For example, the display module such as the LCD module 156 and a touch-sensitive module (not shown) may be integrated into the same module to form a touch-sensitive display device (e.g. a touch screen), and the touch-sensitive display device may comprise a touch controller for performing touch control to detect user inputs via the touch-sensitive module.

The processing circuit 105 (e.g. the host processor 110) and the display panel 150 may be coupled to each other through the display interface circuits 114 and 152, and the display interface circuits 114 and 152 may be implemented with interface circuits complying with a specific specification. For example, the specific specification may be the Mobile Industry Processor Interface (MIPI) Display Serial Interface (DSI) specification of the MIPI Alliance, and the display interface circuits 114 and 152 may be implemented to be DSI circuits. As a result, the host processor 110 (e.g. the core circuit 112 therein) may communicate with the display panel 150, for performing associated control for the electronic device 100. In addition, the electronic device 100 may further comprise additional circuits such as a power management circuit, a wireless communications circuit, a storage interface circuit, etc. (not shown) to provide the electronic device 100 with capabilities of performing associated operations such as power management, wireless communications, storage interfacing, etc. Additionally, the host processor 110 (e.g. the core circuit 112 therein) may control various operations of the electronic device 100. For example, some program codes 112P running on the host processor 110 (e.g. the core circuit 112) may control the electronic device 100, to make the electronic device 100 be equipped with various functions. Examples of the program codes 112P may include, but are not limited to, an operating system (OS), one or more drivers, and one or more applications.

According to this embodiment, the host processor 110 is applicable to display control of the electronic device 100. More particularly, the core circuit 112 may be arranged to control the host processor 110, for controlling the operations of the electronic device 100. Under the control of the core circuit 112, the host processor 110 may perform the display control of the electronic device 100. For example, the host processor 110 (e.g. the core circuit 112) may set a refresh rate of the display interface circuit 114 to be a target refresh rate in advance, for controlling the host processor 110 to output images to the display panel 150 according to the target refresh rate by default, and may dynamically perform refresh-rate adjustment when there is a need, where the display interface circuit 114 may be arranged to control the timing of outputting image data of the images from a frame buffer to the display panel 150, but the present invention is not limited thereto. In addition, the display interface circuits 114 and 152 may be arranged to couple the display panel 150 to the host processor 110, and transmit one or more commands and the image data from the host processor 110 to the display panel 150. As a result, the display panel 150 may display information (e.g. the image data) for the electronic device 100.

As shown in FIG. 1, the display interface circuit 114 may be arranged to couple the display panel 150 to the host processor 110, and the bus interface circuit 116 may be arranged to couple at least one component to the host processor 110 through the bus 105B, where the aforementioned at least one component may comprise the GPU 120, the DRAM 130, and the synthesizer 140, but the present invention is not limited thereto. According to some embodiments, the synthesizer 140 may be integrated into the host processor 110, and more particularly, may be implemented with a program module running on the host processor 110. In addition, the bus interface circuit 116 may conform to a specific communications specification, to allow the host processor 110 to communicate with any of the aforementioned at least one component (e.g. the GPU 120 and the DRAM 130; and the synthesizer 140, for the case that the synthesizer 140 is implemented with a hardware circuit positioned outside the host processor 110 as shown in FIG. 1). For example, the GPU 120, the DRAM 130, and the synthesizer 140 may operate under control of the host processor 110, respectively. Additionally, the RAM such as the DRAM 130 may comprise a color buffer 132 and a metadata buffer 134, where the color buffer 132 and the metadata buffer 134 may be implemented with different buffer regions in the RAM such as the DRAM 130. For example, the color buffer 132 may be arranged to buffer frame information, and the metadata buffer 134 may be arranged to buffer metadata.

According to some embodiments, the circuitry in the host processor 110 shown in FIG. 1 may vary when there is a need. For example, the display interface circuit 114 and the bus interface circuit 116 may be coupled to each other through a direct connection. For another example, within the host processor 110, one or more other components (e.g. a frame buffer for temporarily storing image data to be output to the display panel 150) may be inserted between the display interface circuit 114 and the bus interface circuit 116, and the display interface circuit 114 and the bus interface circuit 116 may be coupled to each other through the one or more other components.

Figure 2:
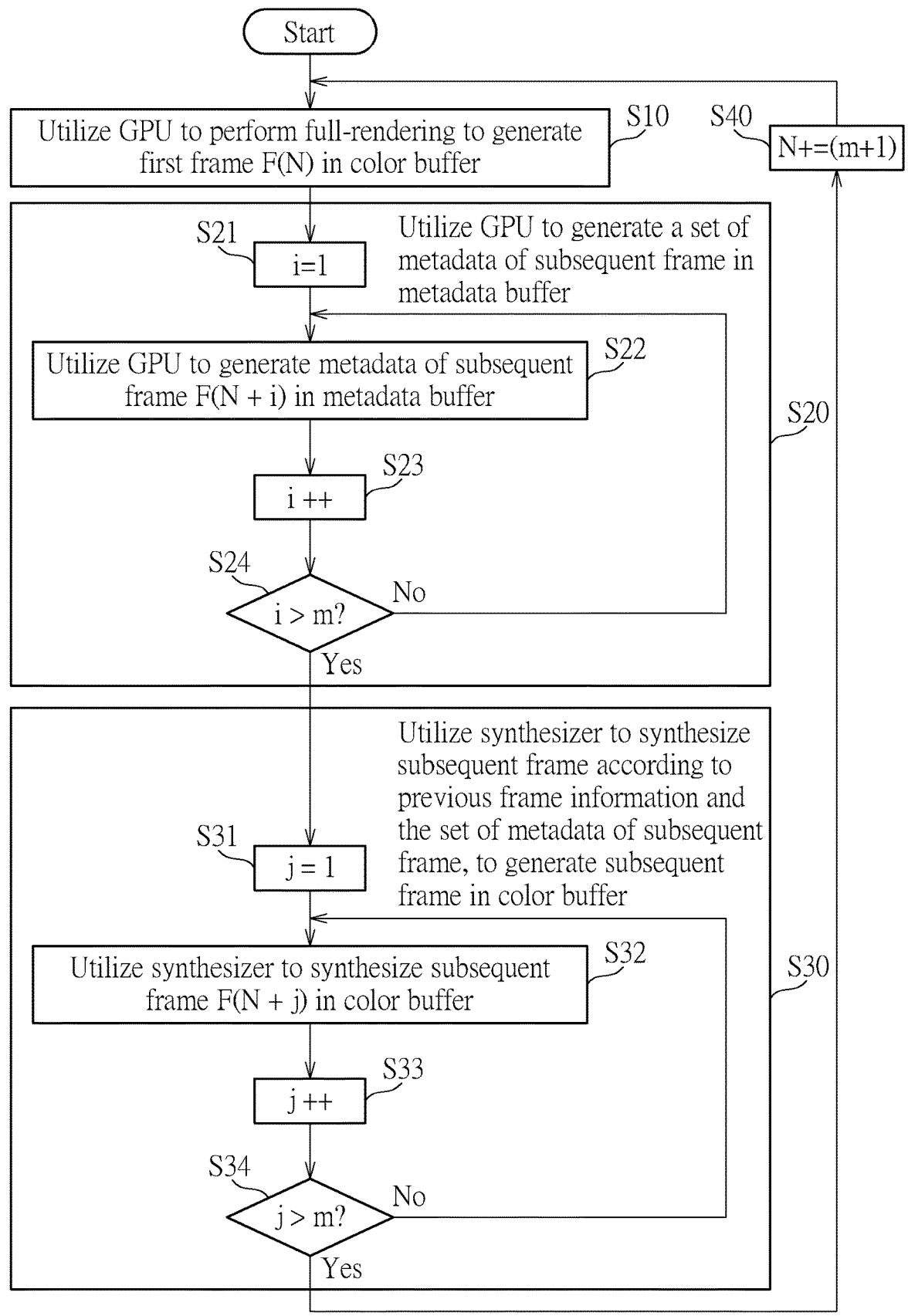
FIG. 2 is a working flow of a method for generating a series of frames with aid of a synthesizer to offload GPU rendering within an electronic device according to an embodiment of the present invention.

FIG. 2 is a working flow of a method for generating a series of frames with aid of a synthesizer to offload GPU rendering within an electronic device according to an embodiment of the present invention. The method may be applied to the electronic device 100 shown in FIG. 1, and more particularly, may be applied to the host processor 110 (e.g. the core circuit 112 running the program codes 112P) and associated components (e.g. the GPU 120, the DRAM 130, and the synthesizer 140) in architecture shown in FIG. 1. Under control of the core circuit 112, the host processor 110 may perform the display control of the electronic device 100 to generate the series of frames with aid of the synthesizer 140 to offload the GPU rendering of the GPU 120.

In Step S10, the host processor 110 may utilize the GPU 120 to perform full-rendering to generate a first frame F(N) (e.g. the symbol "N" may represent an integer) in the color buffer 132, for being output to the display panel 150 and displayed on the display panel 150, where the color buffer 132 (e.g. a buffer for buffering image data of color images) may be taken as an example of the frame buffer mentioned in the embodiment shown in FIG. 1.

In Step S20, the host processor 110 may utilize the GPU 120 to generate a set of metadata of at least one subsequent frame (e.g. one or more subsequent frames, such as one subsequent frame F(N+1) or multiple subsequent frames {F(N+1), . . . , F(N+m)}, where the symbol "m" may represent a positive integer) in the metadata buffer 134. For example, the set of metadata of the aforementioned at least one subsequent frame may comprise one or a combination of depth information regarding deferred shading, normal information regarding the deferred shading (e.g. one or more normal vectors), diffuse color information regarding the deferred shading, and motion vector information regarding motion blur rendering (e.g. one or more motion vectors, and more particularly, motion blur rendering vectors), such as at least one portion (e.g. a portion or all) of the above information. According to this embodiment, Step S20 may comprise some sub-steps such as Steps S21-S24, but the present invention is not limited thereto.

In Step S21, the host processor 110 may set an initial value of the index i to be equal to one (labeled "i=1" in FIG. 2 for brevity).

In Step S22, the host processor 110 may utilize the GPU 120 to generate the metadata of the subsequent frame F(N+i) in the metadata buffer 134.

In Step S23, the host processor 110 may increase the index i with an increment such as one (labeled "i++" in FIG. 2 for brevity).

In Step S24, the host processor 110 may check whether the index i is greater than a predetermined threshold such as m. If Yes, Step 30 is entered; if No, Step S22 is entered.

In Step S30, the host processor 110 may utilize the synthesizer 140 to synthesize the aforementioned at least one subsequent frame according to previous frame information and the set of metadata of the aforementioned at least one subsequent frame, to generate the aforementioned at least one subsequent frame in the color buffer 132, for being output to the display panel 150 and displayed on the display panel 150. For example, the previous frame information of the aforementioned at least one subsequent frame may comprise frame information of a previous frame prior to the aforementioned at least one subsequent frame within the series of frames, such as the frame information (e.g. image data) of the first frame F(N) mentioned in Step S10. According to this embodiment, Step S30 may comprise some sub-steps such as Steps S31-S34, but the present invention is not limited thereto.

In Step S31, the host processor 110 may set an initial value of the index j to be equal to one (labeled "j=1" in FIG. 2 for brevity).

In Step S32, the host processor 110 may utilize the synthesizer 140 to synthesize the subsequent frame F(N+j) in the color buffer 132, and more particularly, to synthesize the subsequent frame F(N+j) according to at least one portion (e.g. a portion or all) of the previous frame information and the metadata of the subsequent frame F(N+j), to generate the subsequent frame F(N+j) in the color buffer 132.

In Step S33, the host processor 110 may increase the index j with an increment such as one (labeled "j++" in FIG. 2 for brevity).

In Step S34, the host processor 110 may check whether the index j is greater than a predetermined threshold such as m. If Yes, Step S40 is entered; if No, Step S32 is entered.

In Step S40, the host processor 110 may increase the frame index N with an increment such as (m+1) (labeled "N+=(m+1)" in FIG. 2 for brevity), to update the frame index N. As a result, the host processor 110 may perform similar operations after Step S10 is entered another time.

Based on the working flow shown in FIG. 2, the host processor 110 may utilize the GPU 120 to perform full-rendering to generate another first frame in the color buffer 132, for being output to the display panel 150 and displayed on the display panel 150, and may utilize the GPU 120 to generate a set of metadata of at least one other subsequent frame (e.g. one or more other subsequent frames coming after the other first frame) in the metadata buffer 134, and may further utilize the synthesizer 140 to synthesize the aforementioned at least one other subsequent frame according to previous frame information (e.g. the frame information of the other first frame) and the set of metadata of the aforementioned at least one other subsequent frame, to generate the aforementioned at least one other subsequent frame in the color buffer 132, for being output to the display panel 150 and displayed on the display panel 150. For better comprehension, assume that the host processor 110 may set an initial value of N to be zero before Step S10 is entered for the first time in the working flow shown in FIG. 2, and therefore, N=0 for the first execution of Steps S10, S20, and S30 in the main loop (e.g. the loop comprising Steps S10-S40), N=(1*(m+1)) for the second execution of Steps S10, S20, and S30 in the main loop, N=(2*(m+1)) for the third execution of Steps S10, S20, and S30 in the main loop, and the reset may be deduced by analogy, but the present invention is not limited thereto. For example, at the beginning of executing the working flow shown in FIG. 2, the first frame F(N) and the subsequent frames {F(N+1), . . . , F(N+m)} may represent the frames {F(0), F(1), . . . , F(m)} before the operation of Step S40 is executed; the first frame F(N) and the subsequent frames {F(N+1), . . . , F(N+m)} may represent the frames {F(m+1), F(m+2), . . . , F((2*m)+1)} after the operation of Step S40 has been executed once; the first frame F(N) and the subsequent frames {F(N+1), . . . , F(N+m)} may represent the frames {F((2*m)+2), F((2*m)+3), . . . , F((3*m)+2)} after the operation of Step S40 has been executed twice; and the reset may be deduced by analogy.

For better comprehension, the method may be illustrated with the working flow shown in FIG. 2, but the present invention is not limited thereto. According to some embodiments, one or more steps may be added, deleted, or changed in the working flow shown in FIG. 2.

According to some embodiments, at least one portion (e.g. a portion or all) of the operations of Steps S10, S20, and S30 may be performed at the same time. For example, the operation of Step S32 regarding synthesizing the subsequent frame F(N+j) may be performed after the metadata of this subsequent frame F(N+j) has been obtained from the operation of Step S22, and the operation of Step S32 regarding synthesizing the subsequent frame F(N+j) and the operation of Step S22 regarding generating the metadata of the next frame F(N+j+1) of this subsequent frame F(N+j) may be performed concurrently. For another example, the operation of Step S10 regarding generate the first frame F(N+m+1) and the operation of Step S32 regarding synthesizing the subsequent frames {F(N+1), . . . , F(N+m)} may be performed concurrently. For brevity, similar descriptions for these embodiments are not repeated in detail here.

Additionally, in the working flow shown in FIG. 2, the host processor 110 may set the initial value of N to be zero when there is a need, but the present invention is not limited thereto. According to some embodiments, the host processor 110 may set the initial value of N to be any of some other values. For brevity, similar descriptions for these embodiments are not repeated in detail here.

Figure 3:
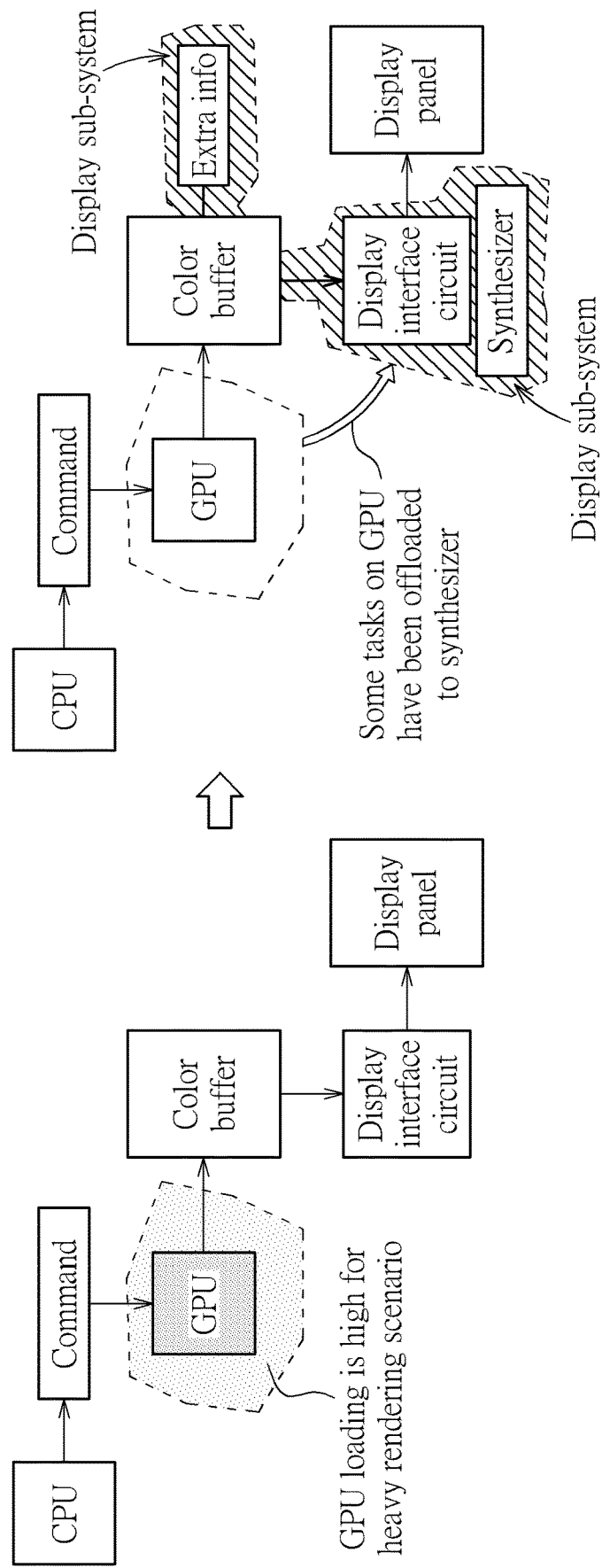
FIG. 3 illustrates an architecture view of the method shown in FIG. 2 according to an embodiment of the present invention.

FIG. 3 illustrates an architecture view of the method shown in FIG. 2 according to an embodiment of the present invention. For better comprehension, assume that the function of offloading some rendering tasks from the GPU 120 to the synthesizer 140 may be temporarily disabled, and the GPU loading is high for a heavy rendering scenario as shown in the left-hand side of FIG. 3, but the present invention is not limited thereto. For example, when the CPU sends one or more commands to the GPU 120, the GPU 120 may perform full-rendering to generate the image data of any of the series of frames in the color buffer 132, and the display interface circuit 114 may obtain the image data from the color buffer 132 and send the image data to the display panel 150. As shown in the right-hand side of FIG. 3, in the architecture equipped with the function of offloading some rendering tasks from the GPU 120 to the synthesizer 140, some tasks on the GPU 120 have been offloaded to the synthesizer 140. For example, when the CPU sends one or more commands to the GPU 120, the GPU 120 may perform full-rendering to generate the image data of a portion of the series of frames in the color buffer 132, and the display sub-system comprising the synthesizer 140, the display interface circuit 114, and a storage unit storing extra information (labeled "Extra info" in FIG. 2 for brevity) such as the metadata buffer 134 storing the metadata may perform the associated operations of generating the remaining portion of the series of frames in the color buffer 132. As a result, the display interface circuit 114 may obtain the image data of any of the series of frames from the color buffer 132 and send the image data to the display panel 150. For brevity, similar descriptions for this embodiment are not repeated in detail here.

Figure 4:
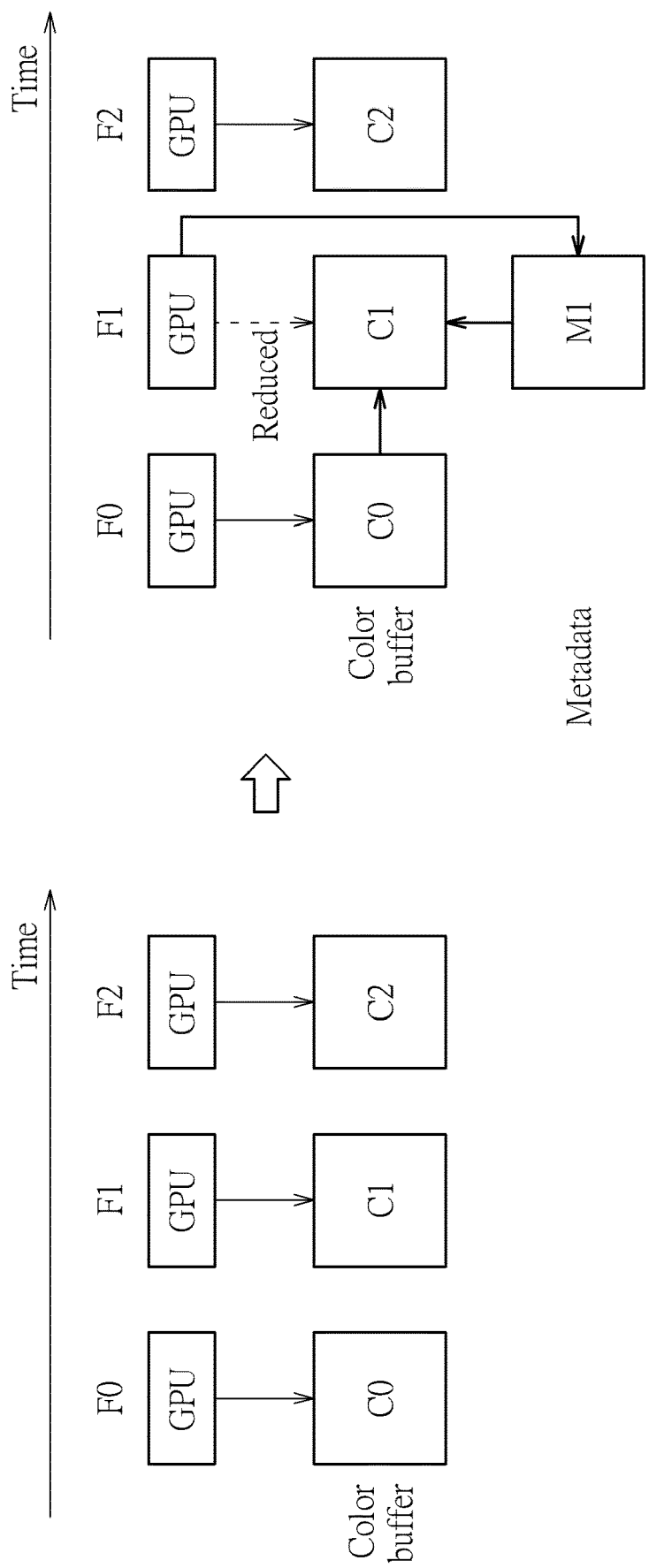
FIG. 4 illustrates a timing flow view of the method shown in FIG. 2 according to an embodiment of the present invention.

FIG. 4 illustrates a timing flow view of the method shown in FIG. 2 according to an embodiment of the present invention. For better comprehension, assume that the function of offloading some rendering tasks from the GPU 120 to the synthesizer 140 may be temporarily disabled, and as shown in the left-hand side of FIG. 4, the GPU 120 may perform full-rendering regarding the series of frames such as the frames F0, F1, F2, etc. to generate the image data C0, C1, C2, etc. of the frames F0, F1, F2, etc. in the color buffer 132, respectively, but the present invention is not limited thereto. As shown in the right-hand side of FIG. 4, in the architecture equipped with the function of offloading some rendering tasks from the GPU 120 to the synthesizer 140, the host processor 110 may utilize the GPU 120 to perform full-rendering regarding a portion of the series of frames, such as the even frames F0, F2, etc., to generate the image data C0, C2, etc. of the even frames F0, F2, etc. in the color buffer 132, respectively. In addition, the host processor 110 may utilize the synthesizer 140 to synthesize the remaining portion of the series of frames, such as the odd frames F1, etc. according to the image data C0, C2, etc. of the even frames F0, F2, etc. and the metadata M1, etc. of the odd frames F1, etc., to generate image data C1, etc. of the odd frames F1, etc. in the color buffer 132, where the host processor 110 may utilize the GPU 120 to generate the metadata M1, etc. of the odd frames F1, etc. in time before the operations of synthesizing the odd frames F1, etc., respectively. As a result, when the host processor 110 performs the display control of the electronic device 100 to generate the series of frames such as the frames F0, F1, F2, etc. for being displayed on the display panel 150 with respect to time, GPU rendering regarding the odd frames F1, etc. may be reduced. For brevity, similar descriptions for this embodiment are not repeated in detail here.

For better comprehension, the even frames F0, F2, etc. may be taken as examples of the first frame F(N) mentioned in Step S10, and the odd frames F1, etc. may be taken as examples of the aforementioned at least one subsequent frame, and may also be taken as examples of the subsequent frames {F(N+1), . . . , F(N+m)} when m=1, but the present invention is not limited thereto. According to some embodiments, when m>1, the host processor 110 may utilize the synthesizer 140 to synthesize more frames of the series of frames than that in the embodiment shown in FIG. 4.

Figure 5:
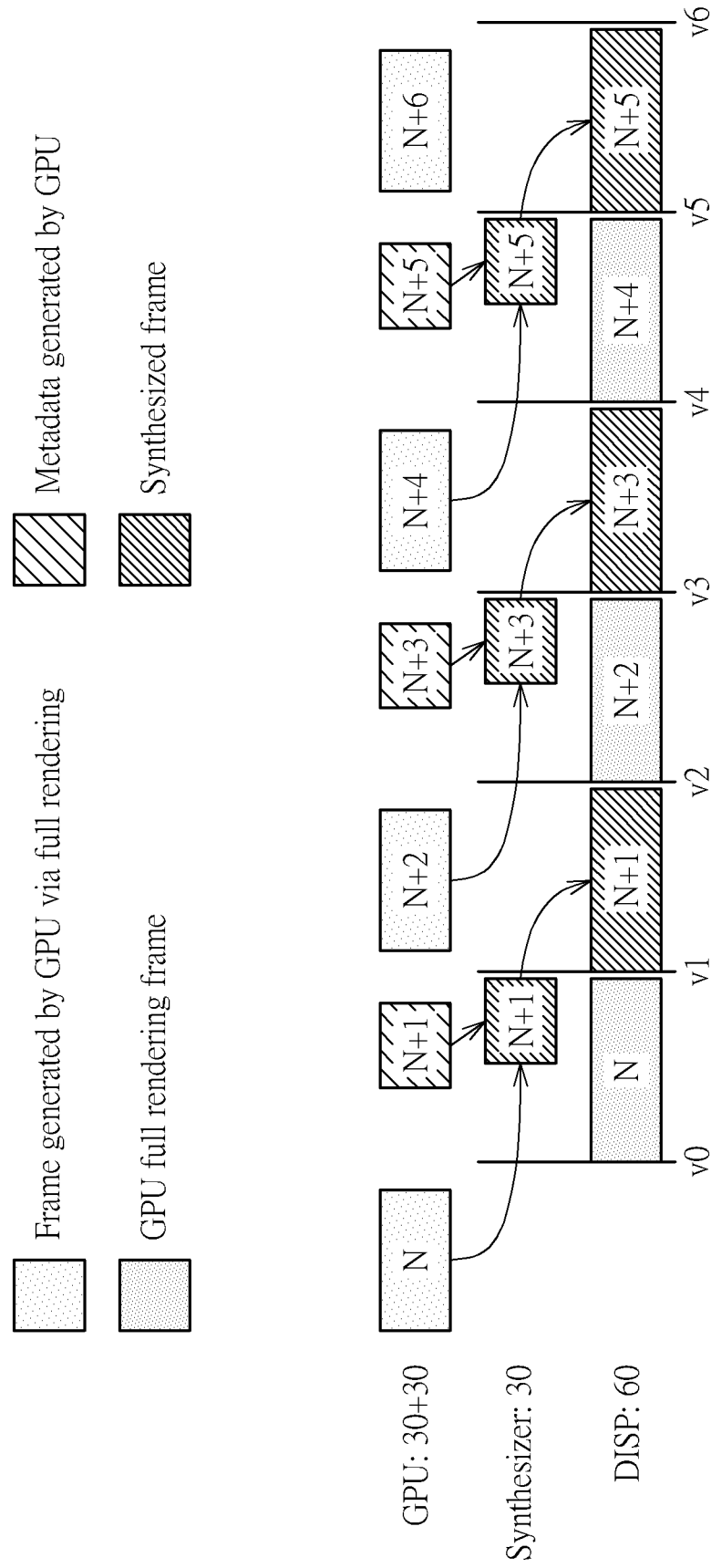
FIG. 5 illustrates a low power control scheme of the method shown in FIG. 2 according to an embodiment of the present invention.

FIG. 5 illustrates a low power control scheme of the method shown in FIG. 2 according to an embodiment of the present invention. For example, a series of vertical lines such as that labeled v0, v1, v2, v3, v4, v5, v6, etc. may represent the respective beginning time points of the display periods as indicated by a display control signal such as a vertical synchronization (v-sync) signal, and the rows of illustration that are labeled with frame index such as N, N+1, etc. may indicate the associated information (e.g. frames, metadata, etc.) corresponding to the frame index according to the legend, but the present invention is not limited thereto. According to this embodiment, the host processor 110 may utilize the GPU 120 to generate the frames F(N), F(N+2), F(N+4), F(N+6), etc. through full-rendering in the frame rate of 30 frame per second (FPS) and to generate the metadata of the frames F(N+1), F(N+3), F(N+5), etc. in the frame rate of 30 FPS (labeled "GPU: 30+30" in FIG. 5, for brevity), and may utilize the synthesizer 140 to synthesize the frames F(N+1), F(N+3), F(N+5), etc. in the frame rate of 30 FPS (labeled "Synthesizer: 30" in FIG. 5, for brevity), and may further utilize the display interface circuit 114 to output the series of frames such as the frames {F(N), F(N+1), F(N+2), F(N+3), F(N+4), F(N+5), F(N+6), . . . } (e.g. the GPU full rendering frames F(N), F(N+2), F(N+4), F(N+6), etc. and the synthesized frames F(N+1), F(N+3), F(N+5), etc.) to the display panel 150 in the frame rate of 60 FPS (labeled "DISP: 60" in FIG. 5, for brevity), for being displayed on the display panel 150. For brevity, similar descriptions for this embodiment are not repeated in detail here.

For better comprehension, the frames F(N), F(N+2), F(N+4), F(N+6), etc. generated by the GPU 120 via full rendering may be taken as examples of the first frame F(N) mentioned in Step S10, and the frames F(N+1), F(N+3), F(N+5), etc. synthesized by the synthesizer 140 may be taken as examples of the aforementioned at least one subsequent frame, and may also be taken as examples of the subsequent frames {F(N+1), . . . , F(N+m)} when m=1, but the present invention is not limited thereto. According to some embodiments, when m>1, the host processor 110 may utilize the synthesizer 140 to synthesize more frames of the series of frames than that in the embodiment shown in FIG. 5.

According to some embodiments, the host processor 110 may trigger a thread running on the GPU 120, for utilizing the GPU 120 to perform the full-rendering to generate the first frame F(N) in the color buffer 132 under control of the thread running on the GPU 120. In addition, the host processor 110 may trigger another thread running on the GPU 120, for utilizing the GPU 120 to generate the set of metadata of the aforementioned at least one subsequent frame in the metadata buffer 134 under control of the other thread running on the GPU 120. For example, the host processor 110 may utilize the color buffer 132 as a next stage of the GPU 120 running the thread within a pipeline, and may utilize the metadata buffer 134 as a next stage of the GPU 120 running the other thread within another pipeline.

Figure 6:
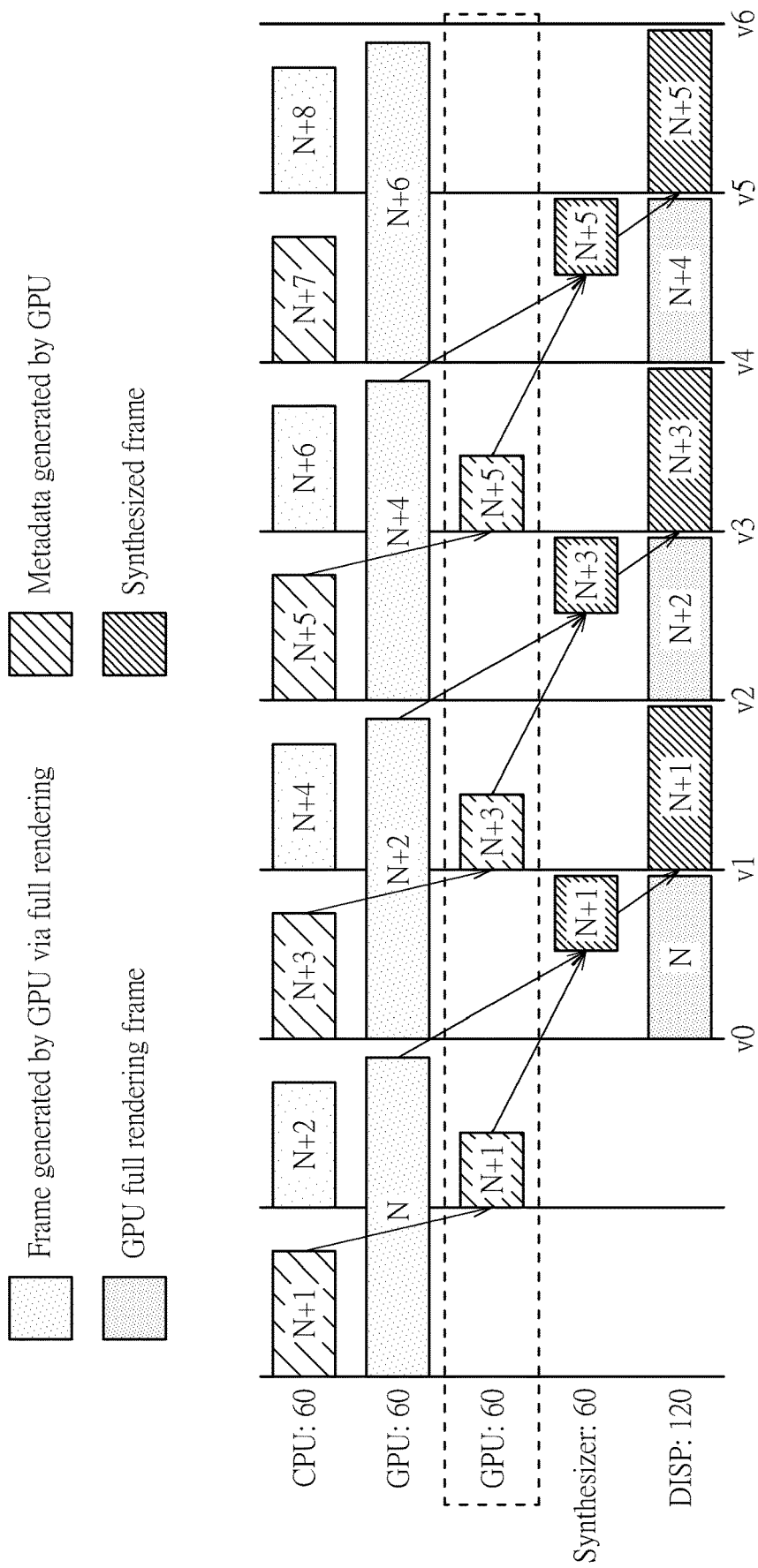
FIG. 6 illustrates a high performance control scheme of the method shown in FIG. 2 according to an embodiment of the present invention.

FIG. 6 illustrates a high performance control scheme of the method shown in FIG. 2 according to an embodiment of the present invention. For example, a series of vertical lines such as that labeled v0, v1, v2, v3, v4, v5, v6, etc. may represent the respective beginning time points of the display periods as indicated by the display control signal such as the v-sync signal, and the rows of illustration that are labeled with frame index such as N, N+1, etc. may indicate the associated information (e.g. commands, frames, metadata, etc.) corresponding to the frame index according to the legend, but the present invention is not limited thereto. According to this embodiment, the host processor 110 (e.g. the CPU) may send commands regarding generating the frames F(N), F(N+2), etc. via full-rendering to the thread running on the GPU 120 and send commands regarding generating the metadata of the frames F(N+1), F(N+3), etc. the other thread running on the GPU 120 in the frame rate of 60 FPS (labeled "CPU: 60" in FIG. 6, for brevity). For example, the host processor 110 may utilize the GPU 120 to generate the frames F(N), F(N+2), F(N+4), F(N+6), etc. through full-rendering in the frame rate of 60 FPS and to generate the metadata of the frames F(N+1), F(N+3), F(N+5), etc. in the frame rate of 60 FPS (respectively labeled "GPU: 60" in FIG. 6, for brevity), and may utilize the synthesizer 140 to synthesize the frames F(N+1), F(N+3), F(N+5), etc. in the frame rate of 60 FPS (labeled "Synthesizer: 60" in FIG. 6, for brevity), and may further utilize the display interface circuit 114 to output the series of frames such as the frames {F(N), F(N+1), F(N+2), F(N+3), F(N+4), F(N+5), F(N+6), . . . } (e.g. the GPU full rendering frames F(N), F(N+2), F(N+4), F(N+6), etc. and the synthesized frames F(N+1), F(N+3), F(N+5), etc.) to the display panel 150 in the frame rate of 120 FPS (labeled "DISP: 120" in FIG. 6, for brevity), for being displayed on the display panel 150. For brevity, similar descriptions for this embodiment are not repeated in detail here.

According to some embodiments, the synthesizer 140 may perform one or more types of processing. For example, the synthesizer 140 may perform blur or de-blocking at the same time to avoid artifact. For another example, the synthesizer 140 may use artificial intelligence (AI) algorithm (AI ALGO) for the output frame prediction. For yet another example, the synthesizer 140 may use the metadata from network streaming for a cloud game. For brevity, similar descriptions for these embodiments are not repeated in detail here.

Figure 7:
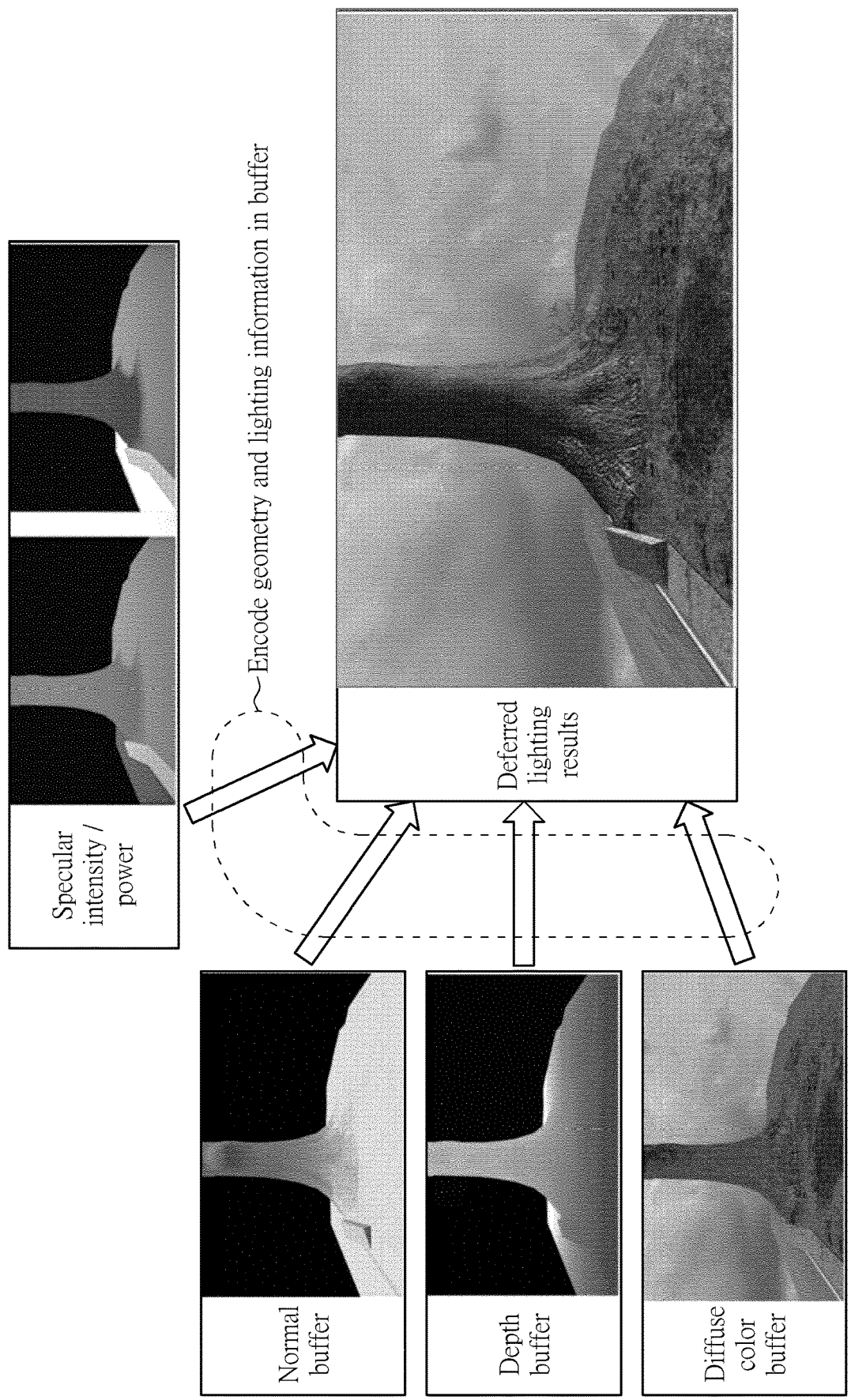
FIG. 7 illustrates deferred shading involved with the method shown in FIG. 2 according to an embodiment of the present invention.

FIG. 7 illustrates deferred shading involved with the method shown in FIG. 2 according to an embodiment of the present invention. For example, the set of metadata of the aforementioned at least one subsequent frame may comprise the depth information regarding the deferred shading, the normal information regarding the deferred shading (e.g. the one or more normal vectors), the diffuse color information regarding the deferred shading, etc., and the metadata buffer 134 may comprise multiple secondary buffers arranged to store the set of metadata, respectively, such as a depth buffer, a normal buffer, a diffuse color buffer, etc. arranged to store the depth information regarding the deferred shading, the normal information regarding the deferred shading (e.g. the one or more normal vectors), the diffuse color information regarding the deferred shading, etc., respectively.

According to this embodiment, the host processor 110 may utilize the synthesizer 140 to synthesize the aforementioned at least one subsequent frame such as the subsequent frame F(N+i) according to the previous frame information such as the specular intensity or specular power (labeled "the specular intensity/power" in FIG. 7 for brevity) of the first frame F(N) and the set of metadata such as the depth information regarding the deferred shading, the normal information regarding the deferred shading (e.g. the one or more normal vectors), the diffuse color information regarding the deferred shading, etc. respectively stored in the depth buffer, the normal buffer, the diffuse color buffer, etc., for example, by encoding geometry and lighting information in the buffers such as the color buffer 132 and the metadata buffer 134, to generate the deferred lighting results to be the aforementioned at least one subsequent frame such as the subsequent frame F(N+i) in the color buffer 132, for being output to the display panel 150 and displayed on the display panel 150. For brevity, similar descriptions for this embodiment are not repeated in detail here.

Figure 8:
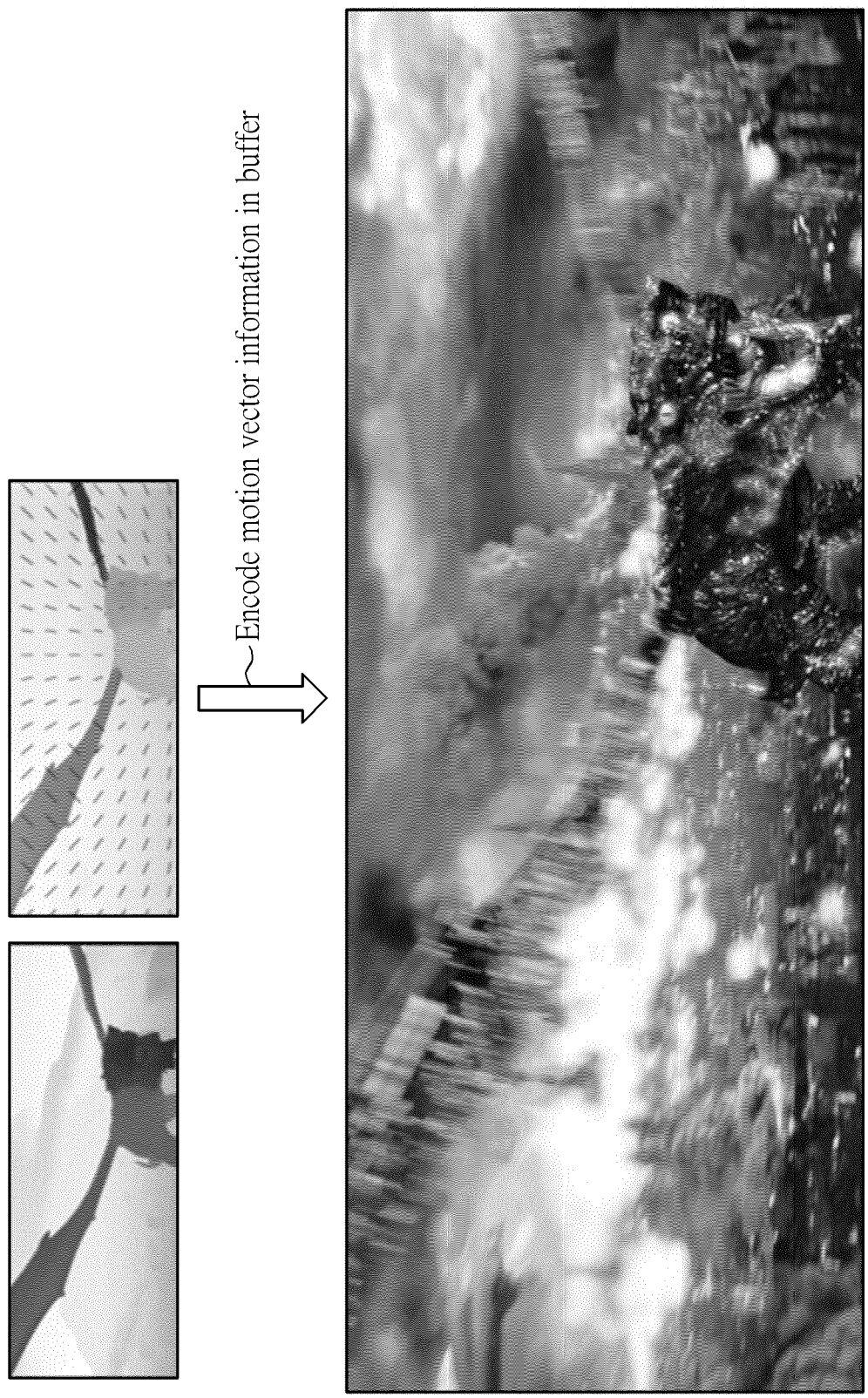
FIG. 8 illustrates motion blur rendering involved with the method shown in FIG. 2 according to an embodiment of the present invention.

FIG. 8 illustrates motion blur rendering involved with the method shown in FIG. 2 according to an embodiment of the present invention. For example, in addition to the depth information regarding the deferred shading, the normal information regarding the deferred shading (e.g. the one or more normal vectors), and the diffuse color information regarding the deferred shading, the set of metadata of the aforementioned at least one subsequent frame may further comprise the motion vector information regarding the motion blur rendering (e.g. the one or more motion vectors, and more particularly, the motion blur rendering vectors), and the multiple secondary buffers of the metadata buffer 134 may further comprise a motion blur rendering buffer arranged to store the motion vector information regarding the motion blur rendering.

According to this embodiment, the host processor 110 may utilize the synthesizer 140 to synthesize the aforementioned at least one subsequent frame such as the subsequent frame F(N+i) according to the previous frame information such as the specular intensity or specular power of the first frame F(N) and the set of metadata such as the depth information regarding the deferred shading, the normal information regarding the deferred shading (e.g. the one or more normal vectors), the diffuse color information regarding the deferred shading, and the motion vector information regarding the motion blur rendering respectively stored in the depth buffer, the normal buffer, the diffuse color buffer, and the motion blur rendering buffer, for example, by encoding the geometry and lighting information and the motion vector information in the buffers such as the color buffer 132 and the metadata buffer 134, to generate the deferred lighting results to be the aforementioned at least one subsequent frame such as the subsequent frame F(N+i) in the color buffer 132, for being output to the display panel 150 and displayed on the display panel 150. For brevity, similar descriptions for this embodiment are not repeated in detail here.

According to some embodiments, a dedicated hardware circuit such as the synthesizer 140 may perform the motion blur rendering, to offload some tasks on the GPU 120, but the present invention is not limited thereto. For brevity, similar descriptions for these embodiments are not repeated in detail here.

According to some embodiments, the multiple secondary buffers such as the depth buffer, the normal buffer, the diffuse color buffer, and the motion blur rendering buffer may be implemented with multiple buffer regions in the RAM such as the DRAM 130, and may be regarded as multiple subsets of the buffer region for implementing the metadata buffer 134 in the DRAM 130, but the present invention is not limited thereto. For brevity, similar descriptions for these embodiments are not repeated in detail here.

Figure 9:
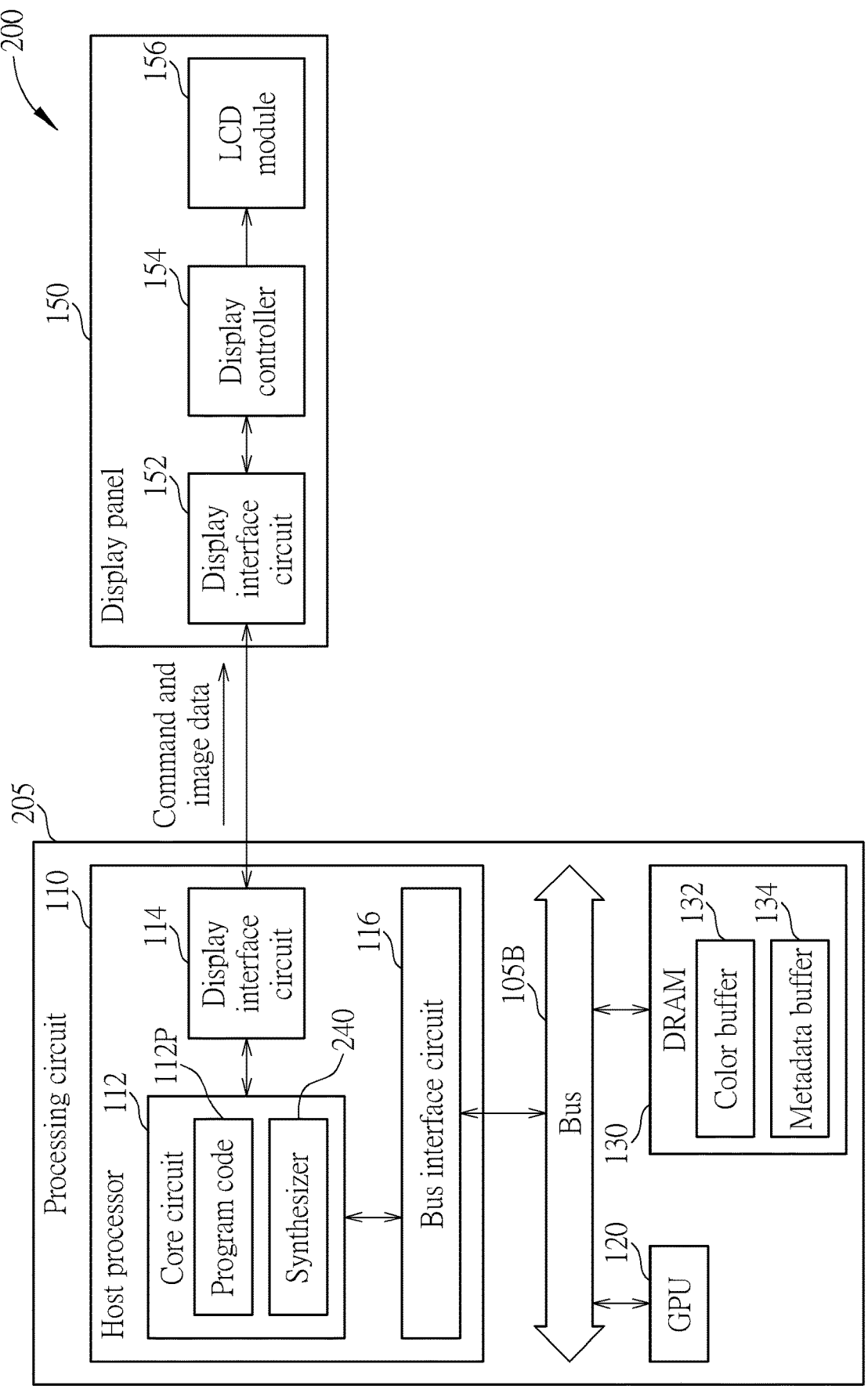
FIG. 9 is a diagram of an electronic device according to another embodiment of the present invention.

FIG. 9 is a diagram of an electronic device 200 according to another embodiment of the present invention. In comparison with the architecture shown in FIG. 1, the synthesizer 140 mentioned above may be integrated into the host processor 110, and more particularly, may be implemented with the program module running on the host processor 110, such as the synthesizer 240. In response to the change in the architecture, some numerals may be changed correspondingly. For example, the synthesizer 140, the processing circuit 105, and the electronic device 100 mentioned above may be replaced by the synthesizer 240, the processing circuit 205, and the electronic device 200, respectively. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating a series of frames with aid of a synthesizer to offload graphics processing unit (GPU) rendering within an electronic device, the method comprising:

utilizing a GPU to perform full-rendering to generate a first frame in a color buffer, for being output to a display panel and displayed on the display panel, and triggering a thread running on the GPU, for utilizing the GPU to perform the full-rendering to generate the first frame in the color buffer under control of the thread running on the GPU, wherein the GPU, the color buffer, and the display panel are positioned in the electronic device;

utilizing the GPU to generate a set of metadata, regarding frame synthesis corresponding to three-dimensional (3D) rendering, of at least one subsequent frame in a metadata buffer, and triggering another thread running on the GPU, for utilizing the GPU to generate the set of metadata of said at least one subsequent frame in the metadata buffer under control of the other thread running on the GPU, wherein the metadata buffer is positioned in the electronic device; and utilizing the synthesizer to synthesize said at least one subsequent frame according to previous frame information and the set of metadata of said at least one subsequent frame, to generate said at least one subsequent frame in the color buffer, for being output to the display panel and displayed on the display panel.

2. The method of claim 1, wherein the set of metadata of said at least one subsequent frame comprises one or a combination of depth information regarding deferred shading, normal information regarding the deferred shading, diffuse color information regarding the deferred shading, and motion vector information regarding motion blur rendering.

3. The method of claim 1, wherein the previous frame information of said at least one subsequent frame comprises frame information of a previous frame prior to said at least one subsequent frame within the series of frames.

4. The method of claim 3, wherein the previous frame represents the first frame.

5. The method of claim 1, wherein said at least one subsequent frame comprises multiple subsequent frames.

6. The method of claim 1, further comprising:
utilizing the color buffer as a next stage of the GPU running the thread within a pipeline; and
utilizing the metadata buffer as a next stage of the GPU running the other thread within another pipeline.

7. The method of claim 1, wherein the synthesizer is implemented with a program module running on a host processor, wherein the host processor and the GPU are positioned in a processing circuit within the electronic device.

8. The method of claim 1, wherein the synthesizer is implemented with a hardware circuit positioned outside a host processor, wherein the synthesizer, the host processor, and the GPU are positioned in a processing circuit within the electronic device.

9. The method of claim 1, further comprising:
utilizing the GPU to perform full-rendering to generate another first frame in the color buffer, for being output to the display panel and displayed on the display panel;
utilizing the GPU to generate a set of metadata of at least one other subsequent frame in the metadata buffer; and
utilizing the synthesizer to synthesize said at least one other subsequent frame according to previous frame information and the set of metadata of said at least one other subsequent frame, to generate said at least one other subsequent frame in the color buffer, for being output to the display panel and displayed on the display panel.

10. A host processor, applicable to generating a series of frames with aid of a synthesizer to offload graphics processing unit (GPU) rendering within an electronic device, the host processor comprising:
a core circuit, arranged to control the host processor, for controlling operations of the electronic device, wherein under control of the core circuit, the host processor performs display control of the electronic device to generate the series of frames with aid of the synthesizer to offload the GPU rendering;
a display interface circuit, coupled to the core circuit, arranged to couple a display panel to the host processor; and
a bus interface circuit, coupled to the core circuit, arranged to couple at least one component to the host processor through a bus, wherein said at least one component comprises a GPU;
wherein:
the host processor utilizes the GPU to perform full-rendering to generate a first frame in a color buffer, for being output to the display panel and displayed on the display panel, and triggers a thread running on the GPU, for utilizing the GPU to perform the full-rendering to generate the first frame in the color buffer under control of the thread running on the GPU, wherein the GPU, the color buffer, and the display panel are positioned in the electronic device;
the host processor utilizes the GPU to generate a set of metadata, regarding frame synthesis corresponding to three-dimensional (3D) rendering, of at least one subsequent frame in a metadata buffer, and triggers another thread running on the GPU, for utilizing the GPU to generate the set of metadata of said at least one subsequent frame in the metadata buffer under control of the other thread running on the GPU, wherein the metadata buffer is positioned in the electronic device; and
the host processor utilizes the synthesizer to synthesize said at least one subsequent frame according to previous frame information and the set of metadata of said at least one subsequent frame, to generate said at least one subsequent frame in the color buffer, for being output to the display panel and displayed on the display panel.

11. The host processor of claim 10, wherein the set of metadata of said at least one subsequent frame comprises one or a combination of depth information regarding deferred shading, normal information regarding the deferred shading, diffuse color information regarding the deferred shading, and motion vector information regarding motion blur rendering.

12. The host processor of claim 10, wherein the previous frame information of said at least one subsequent frame comprises frame information of a previous frame prior to said at least one subsequent frame within the series of frames.

13. The host processor of claim 12, wherein the previous frame represents the first frame.

14. The host processor of claim 10, wherein said at least one subsequent frame comprises multiple subsequent frames.

15. The host processor of claim 10, wherein the host processor utilizes the color buffer as a next stage of the GPU running the thread within a pipeline, and utilizes the metadata buffer as a next stage of the GPU running the other thread within another pipeline.

16. The host processor of claim 10, wherein the synthesizer is implemented with a program module running on the host processor, wherein the host processor and the GPU are positioned in a processing circuit within the electronic device.

17. The host processor of claim 10, wherein the synthesizer is implemented with a hardware circuit positioned outside the host processor, wherein the synthesizer, the host processor, and the GPU are positioned in a processing circuit within the electronic device.

18. The host processor of claim 10, wherein the color buffer and the metadata buffer are implemented with different buffer regions in a random access memory (RAM).

19. A processing circuit comprising the host processor of claim 10, further comprising:
the color buffer, arranged to buffer frame information;
the metadata buffer, arranged to buffer metadata; and
the GPU, coupled to the host processor, the color buffer, and the metadata buffer, arranged to operate under control of the host processor.

20. The processing circuit of claim 19, comprising:
a random access memory (RAM), arranged to store information for the electronic device, wherein the color buffer and the metadata buffer are implemented with different buffer regions in the RAM.

21. The electronic device comprising the host processor of claim 10, wherein the electronic device comprises:
a processing circuit, comprising:
the host processor, arranged to control the operations of the electronic device;
the color buffer, arranged to buffer frame information;
the metadata buffer, arranged to buffer metadata; and
the GPU, coupled to the host processor, the color buffer, and the metadata buffer, arranged to operate under control of the host processor; and the display panel, coupled to the host processor, arranged to display information.

22. The electronic device of claim 21, wherein the processing circuit comprises:

a random access memory (RAM), arranged to store information for the electronic device, wherein the color buffer and the metadata buffer are implemented with different buffer regions in the RAM.

\* \* \* \* \*